United States Patent [19]

Manfre et al.

[11] 3,791,172

[45] Feb. 12, 1974

[54] APPARATUS FOR MAKING A GLASS OR THE LIKE COATED WIRE

[75] Inventors: Giovanni Manfre; Domenico Vianello, both of Novara, Italy

[73] Assignee: Montecatini Edison S.p.A., Milan, Italy

[22] Filed: July 20, 1972

[21] Appl. No.: 273,638

[30] Foreign Application Priority Data
July 21, 1971 Italy.................................... 7513/71
July 21, 1971 Italy.................................... 7514/71

[52] U.S. Cl...................... 65/11 W, 29/419, 29/429, 65/12, 65/13, 72/46, 117/129, 322/164
[51] Int. Cl......................... C03b 37/02, B22d 11/00
[58] Field of Search ..... 65/2, 13, 12, 11 W; 29/419, 29/429, 473.3; 117/129; 322/164; 72/46

[56] References Cited
UNITED STATES PATENTS
1,227,346  5/1917  Trood et al..................... 29/419 X
3,037,241  6/1962  Bazinet et al..................... 65/13 X
3,483,072  12/1969  Cox et al. ............................ 65/13 X
3,652,248  3/1972  Loxley et al........................ 65/13 X FOREIGN PATENTS OR APPLICATIONS
239,719  2/1946  Switzerland.............................. 65/13
968,520  9/1964  Great Britain........................... 72/46

*Primary Examiner*—Robert L. Lindsay, Jr.
*Attorney, Agent, or Firm*—Richard K. Stevens

[57] ABSTRACT

An apparatus for coating a wire with glass or the like having a means for moving a metal rod and a glass or the like tube thereabout along the same path independently of each other into a heating means comprises rollers for gripping and moving the rod and a worm screw and carriage threadedly secured to the screw and for gripping the tube. The rollers and carriage are driven independent drive means. A device for heating the metal rod is provided with a truncated conically shaped crucible heated electrically as a resistor and with means for cooling a coated wire drawn from the mass of metal and glass in the crucible.

4 Claims, 9 Drawing Figures

APPARATUS FOR MAKING A GLASS OR THE LIKE COATED WIRE

The present invention relates to a process and apparatus for obtaining metal wires covered with glass or glass-ceramic material, with various ratios of metal core diameter/coating thickness, by means of drawing from the appropriate molten material. More particularly, the invention provides a novel apparatus for carrying a metal rod and tube into a heater and to a novel apparatus for melting the metal rod and for drawing a glass coated wire therefrom.

Thin metal wires, even of 1 $\mu$ m diameter, coated with glass or glass-ceramic material, have many different uses; e.g., in the electrical and electronic fields as conductors, microthermocouples and resistances; in the medical field as micro-electrodes; in the field of composite materials as reinforcing elements or as conductors of electricity or heat in ceramic masses. By removing the coating, it is possible to obtain uncoated metal wires and thus considerably expand the field of application, mainly in the field of composite materials for application in the structural field, in the electro-magneto-electronic field, in the thermal field as well as in the textile field as anti-static fibres, or in the acoustical field as sound-absorbing felts.

Methods for obtaining metal wires covered with glass from molten material by heating the end of a glass tube containing the metal are already known (French Pat. No. 1,452,979; U.S. Pat. Nos. 3,214,805 and 3,256,584).

In general, the heating is obtained via electromagnetic induction which melts the metal which, in its turn, softens the glass. A variant on the heating system is represented by an induction-heating superimposed onto a radiation-heating carried out by a block of graphite, or carbon or silicon carbide, with a cylindrical hole in the center of the block (U.S. Pat. No. 3,362,803).

Such heating methods are difficult to control because of the levitation of the metal to be drawn, due to the electromagnetic force involved, and to the very special geometrical shape of the induction coil which depends on the metal, on the glass to metal ratio and on the feeding rate of the glass tube containing the metal. All these conditions must be carefully controlled in order to produce continuous metal wires. Moreover, with metals having particular surface tension or particular expansion coefficients (as for instance gold and iron), it is not possible to obtain continuous wires by the above described methods.

Thus, with the conventional methods it is difficult, and in some instances even impossible, to obtain continuous coated metal wires of uniform diameter.

In order to obtain metal wires covered with glass, with a different ratio of metal-core diameter to thickness of coating, when operating according to the known prior art, it is necessary to revert to glass tubes and to metal bars of different diameters, which, when suitably combined, shall result in a wire with the coating ratio. All this requires the availability of metal bars and glass tubes of various sizes, and often requires the changing of the drawing conditions.

An object of this invention is to provide a process and apparatus capable of producing glass or glass-ceramic coated metal wires, with various ratios between the metal core diameter and the coating thickness, and without having to revert to glass or glass-ceramic tubes and to metal bars of different sizes.

Another object of this invention is to provide a simple but practical process and apparatus for coating metal wires with glass or glass-ceramics adapted to vary the relative core diameter and coating thickness without changing the metal or glass to different sizes.

A further object of this invention is to provide a process which is devoid of the foregoing disadvantages for making continuous metal wires, coated with glass or glass-ceramic materials and having a uniform diameter.

Still another object of this invention is to provide a process which will produce continuous coated wires having a small diameter and with a thin coating.

A still further object is to provide a process and apparatus which will produce continuous metal wires from metals or metal alloys, either low melting or high melting, and from various metals or metal alloys including rigid ones.

These objects and others which will become apparent from the following description are accomplished, generally speaking, in accordance with this invention by providing a process wherein a glass or glass-ceramic tube and a metal bar enclosed by said tube are fed to a melting zone at independent feed rates, a metal wire coated with the glass or glass-ceramic material is drawn from the resulting melted mass to the desired diameter of metal core, and the resulting coated wire is wound on a reel. The invention also provides a radiant heating zone for melting the metal inside a metal crucible shaped like a truncated cone and electrically heated as a resistor.

The tube and the bar are made to melt in the drawing zone by heating, and are drawn appropriately to obtain the desired coated wire which is then wound up on a reel. A container of liquid for cooling the drawn wire may be provided immediately following the cone in the wire drawing zone.

One embodiment of the apparatus which is especially suited for carrying out the process, is a special feeding device which comprises: a vertical helical screw, driven by a variable speed motor-reducer; a horizontal shelf, connected through a threaded bushing to the helical screw, which slides vertically along the screw and that keeps the glass or glass-ceramic tube in a vertical position; and a small motor, fixed to the horizontal shelf, fitted with speed reducers which drive two small rolls that drag forward the metal bar within the tube.

By means of this apparatus it is possible to readily vary the feeding speed of the metal bar in the drawing zone independently of the feeding speed of the glass or glass-ceramic tube.

As used herein, the term "glass material" means a material having an amorphous structure, such as glass, silica and the like materials; the term "glass-ceramic material" means a material having an amorphous structure like a glass that, due to its particular composition, undergoes a partial or a complete devitrification owing to the process by which the forming coated wire is spun and thus assuming, at least partially, a crystalline structure.

One embodiment of the apparatus provided for obtaining coated metal wires, therefore includes a means for heating one end of a glass or glass-ceramic tube and of a metal rod inside the tube comprising a metal crucible shaped like a truncated cone and heated as a resistor, a liquid cooling system for the drawing cone preferably containing a lubricating and antistatic liquid, a winding up and drawing system for obtaining the desired diameter and a smooth uniform winding up of the wire on the reel.

The resistance heating system may be a truncated cone shaped crucible of electrically conductive material. The crucible may be silite (CSi), stainless steel or tantalum depending upon the melting point of the metal to be drawn.

In general, the crucible is made of Pt-Rh for metals or alloys from low-melting up to those, such as Al, Ag, Cu and Au, which have melting points from 600° and 1,100°C. The crucible is of Ir for metals or metal alloys melting at about 1,500°C, such as iron and steel. Both Pt-Rh as well as the Ir, are easily shaped into a crucible of the desired shape and may be kept in operation for long stretches of time.

The rod of metal or of metal alloys and the glass or glass-ceramic tube thereabout are advanced independently at constant speeds through the crucible. The feeding device described herein may be used to advantage in combination with the heating crucible to provide coated tubes of various coating thicknesses and core diameters.

The crucible is heated electrically as a resistor. Such a heating system ensures an accurate control over the temperature during the drawing, through a series of thermocouples arranged in the crucible and connected with a device provided which automaticaly controls the temperature (CAT) by controlling the power fed to the crucible. The crucible is coated with a layer of a few microns of a refractory material of the stabilized $ZrO_2$ or $Al_2O_3$ type, sprayed onto the inner and outer surface of the crucible by means of the plasma-jet method. By this method one avoids partially the evaporation of the molten metal and also avoids alloying the metal with the metal of the crucible wall in the event the molten metal contacts the wall.

The present invention will now be described in more detail by reference to the accompanying drawings given for merely illustrative purposes and in which.

Figure 7:
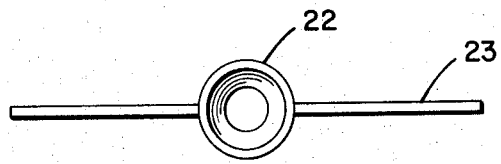
Figure 6:
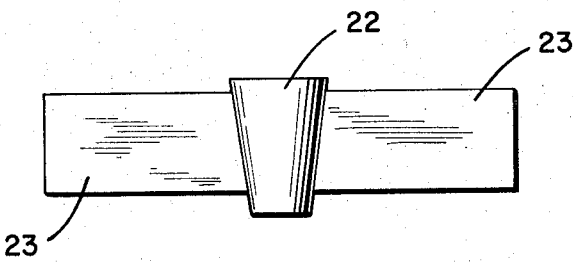
Figures 4, 5:
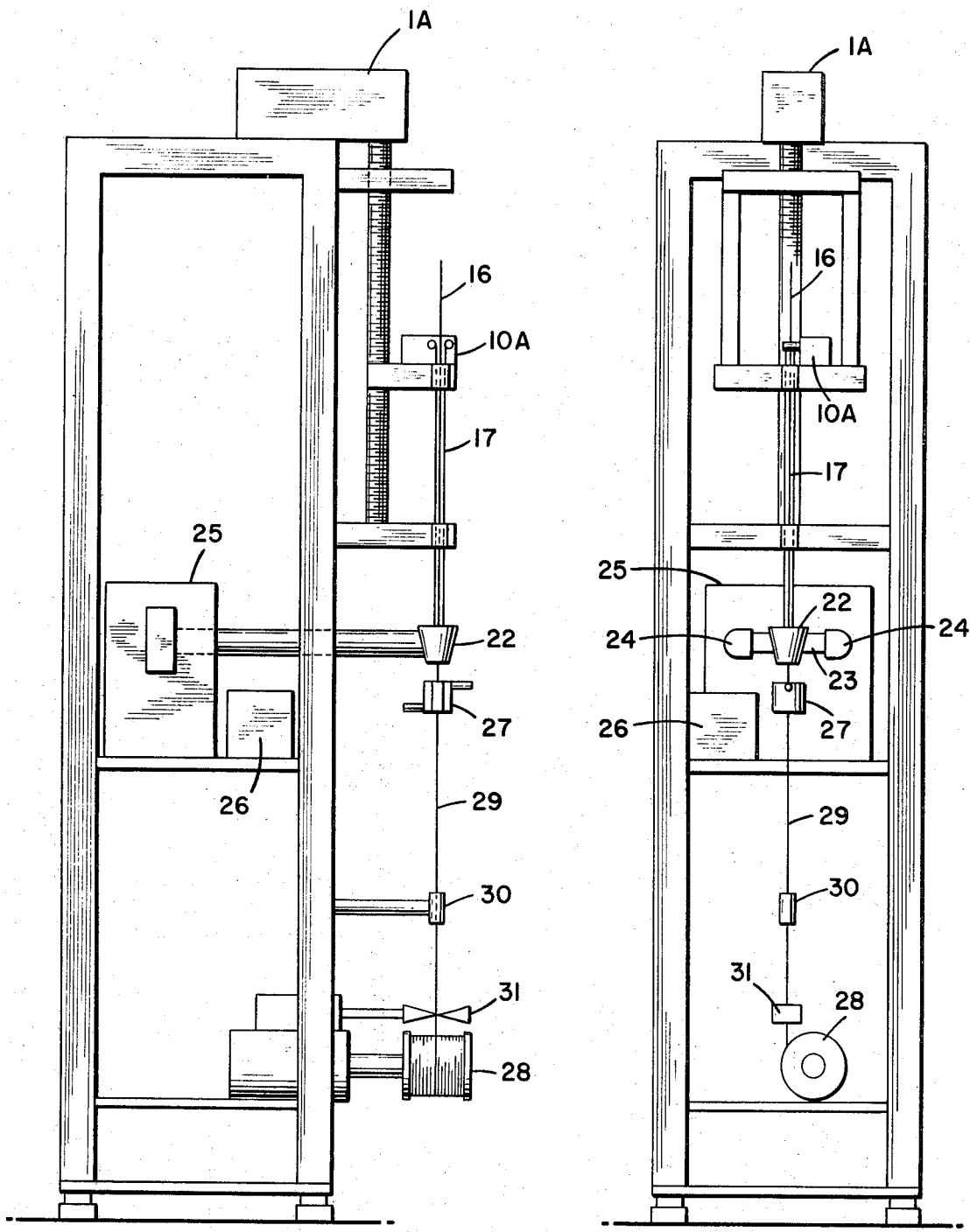
Figure 8:
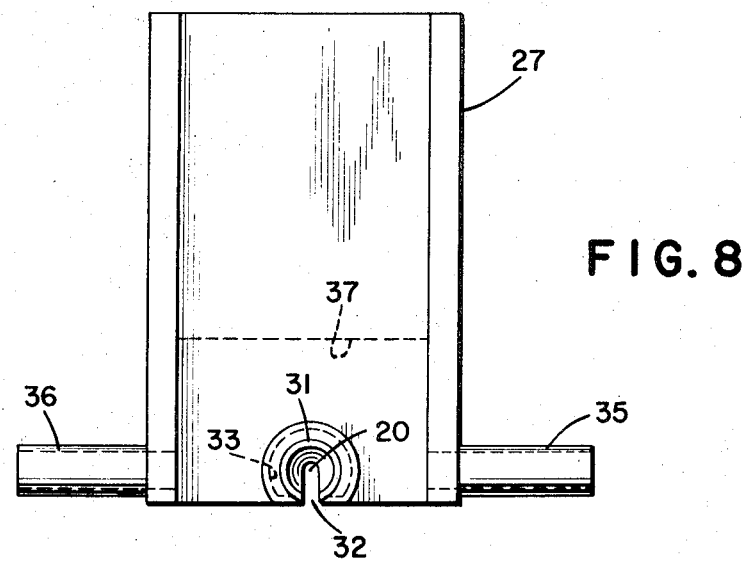
Figure 9:
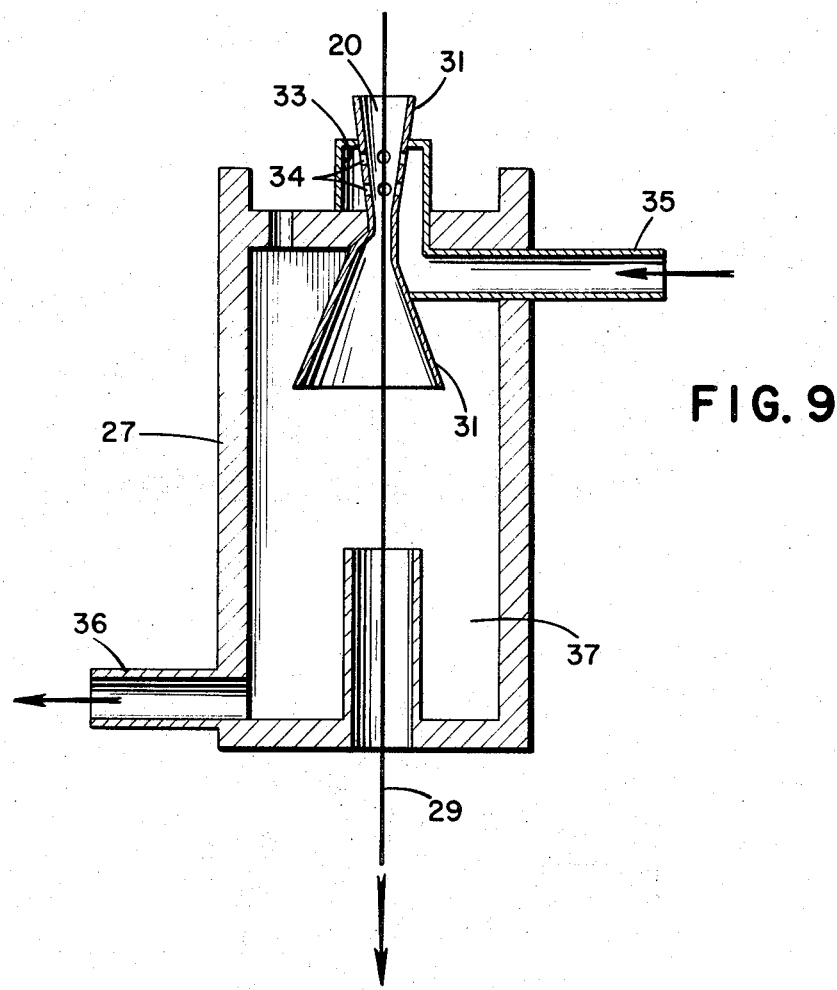

FIGS. 4 and 5, in a schematic form, represent a front and side view respectively of a drawing installation provided by the invention;

FIGS. 6 and 7, in a schematic form, represent a front view and a plan view, respectively, of the heating crucible provided by the invention;

FIGS. 8 and 9, also in schematic form, represent a plan view and a side elevation respectively, of the cooling device of the invention.

Figure 1:
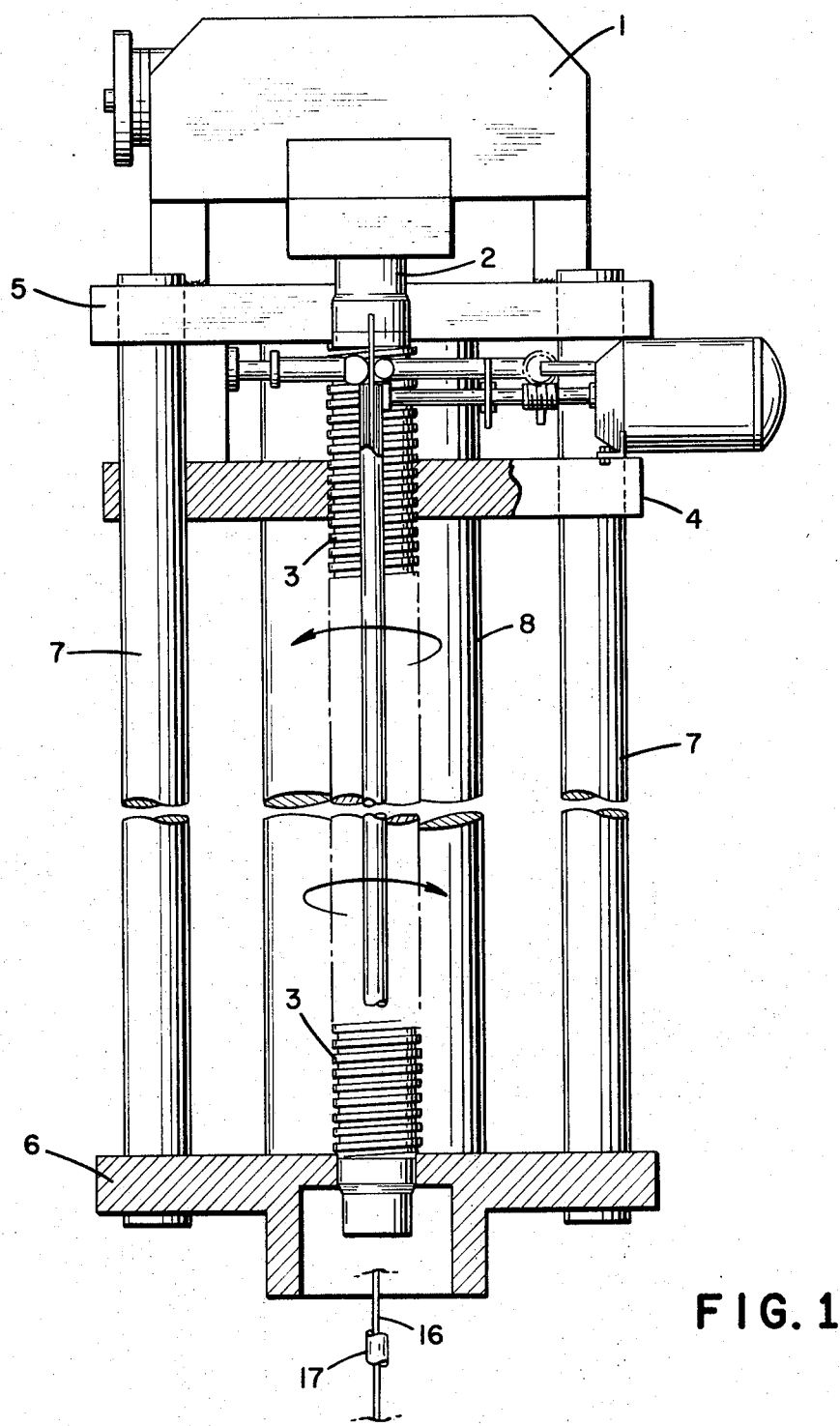
FIG. 1 represents a general front view of the feeding apparatus according to this invention, of the glass or glass-ceramic tube and of the metal bar in the zone where drawing from molten material takes place.

In the upper part of FIG. 1, there is shown a motor-speed-reducer 1 which has the property of varying the speed such as from 1 to 9 r.p.m. The speed variations and the control over the same are electronically effected in a per se well known manner. Shaft 2 is disposed at an angle of 90° with the axle of the mtoor and is connected to the lower part, through an elastic coupling, to wormscrew 3 with a 5 mm pitch, on which wormscrew is fixed a movable carriage 4. The motor-speed-reducer 1 and the helical screw 3 are fixed and splined on 5 and 6 by means of two bars 7 and two supports. Column 8 forms the support of the whole apparatus.

Figure 2:
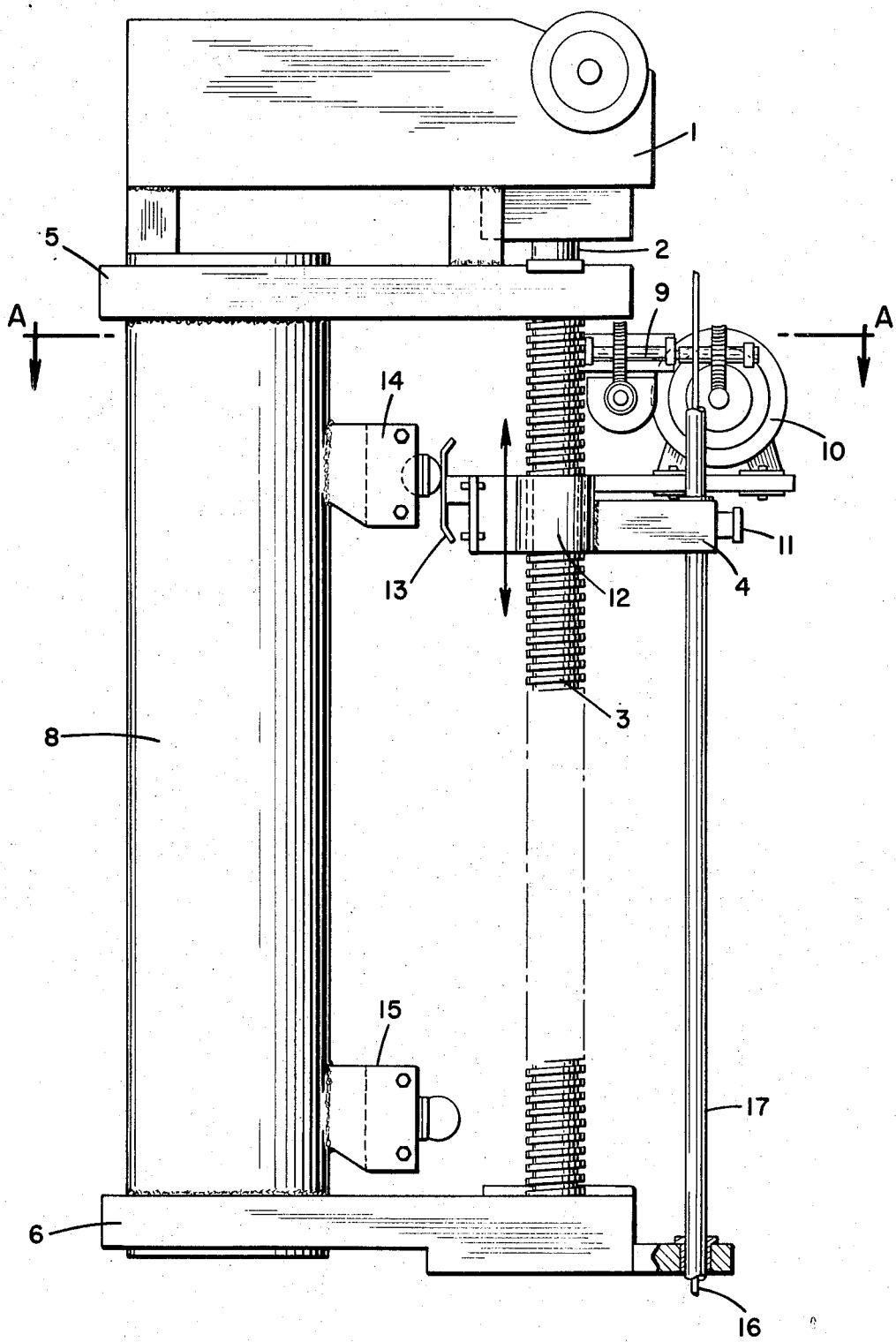
FIG. 2 represents a full side view of the apparatus of FIG. 1.

As shown in FIG. 2, the wormscrew 3 is fixed to a movable carriage or shelf 4 by means of a threaded bushing 12. This shelf 4 is capable of being displaced upwardly or downwardly, depending upon the direction of the rotation that is imparted to the wormscrew driven by the motor-speed-reducer 1. On shelf 4 there is a clamp 11 on which is fixed the tube 17 made of material that softens when passing through the heating crucible (glass or glass-ceramic material).

Adjacent clamp 11 and on the shelf 4 there is arranged driving motor 10 having a series of three-step speed reducers 9 which allow an angular speed variation of from 0.04 to 36 r.p.m. and thus a proportional feed of the metal bar 16 independently of the feed of the tube 17.

The useful length of the vertical travel of shelf 4 is approximately 80 cm. This length may be varied somewhat above or below this value as desired, depending on the duration of the drawing and, thus, on the length of the wire.

The threaded rod or wormscrew 3 is associated with two adjustable limit switches, an upper one 14 and a lower one 15, which prevent the moving shelf 4 from hitting the two flanges 5 and 6 and thereby avoid the possibility of damaging the apparatus. Contact 13 attached to the shelf 4 activates the pushbuttons of limit switches 14 and 15, which in turn stop the motor-speed-reducer 1.

Figure 3:
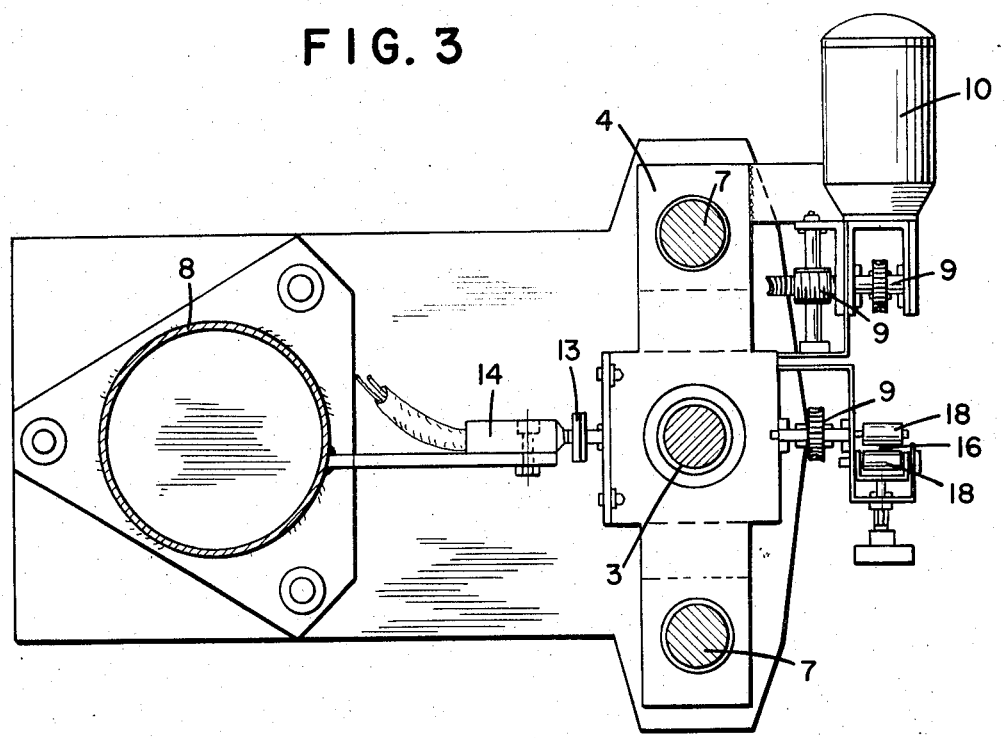
FIG. 3 represents a cross-section along A—A of FIG. 2.

FIG. 3 shows a cross-section along A—A of the apparatus (see FIG. 2) in plan view, the cross-section being taken at the level of the rollers 18 which grip the metal rod 16 and which are driven by motor 10 through the speed-reducer 9.

Some illustrative examples of this invention are as follows:

EXAMPLE 1

By means of the apparatus described above, drawing tests were carried out under the following conditions:

A copper rod with a purity of 99.99 percent and a diameter of 1 mm was introduced into a tube of "Supermax" glass (a borosilicate glass commercially available from Schott & Genossen) having an inside diameter of 5 mm and a wall thickness of 1 mm. One end of said glass tube 17 and one end of said metal rod 16 were respectively fixed to the clamps 11 and to the rollers 18 thereby allowing both the tube and the rod to be advanced inside the heating zone (at the temperature of 1360°C) at different and independent speeds.

By keeping the drawing rate performed by the winding drum constant and by independently varying the feeding speeds of the tube and of the rod inside and through the heating zone, glass-covered metal wires having different ratios of metal core diameter to glass coating thickness were obtained, although starting from the same metal rod and from the same glass tube.

In the following Table 1 two series of tests are recorded the former being carried out by keeping the drawing rate of the winding drum at 20 m/min and the latter by keeping the drawing rate at 2,000 m/min:

EXAMPLE 2

Drawing tests under the following conditions were carried out in the apparatus described above:

A rod of pure aluminum, Rafinal type, produced by the I.S.M.L. firm and having a diameter of 1 mm, was introduced into a tube of glass-ceramic material having the following molar composition: $SiO_2$ 60%; $Al_2O_3$ 10%; $Li_2O$ 30 percent; and having an inside diameter of 3 mm and an outside diameter of 5.5 mm. One end of said tube 17 and one end of said rod 16 were respectively fixed to the clamps 11 and to rollers 18, thereby allowing both the tube and the rod to be advanced inside the heating zone (at the temperature of 1,160°C) at different and independent speeds.

By keeping the drawing rate performed by the winding drum constant (25 m/min) and by varying the feeding speeds of the tube and of the rod inside the heating zone, covered metal wires (see Table 2) having different ratios of metal core diameter to coating thickness were obtained, although starting from the same metal rod and from the same glass-ceramic tube.

EXAMPLE 3

Additional drawing tests under the following conditions were carried out in the apparatus described above:

A rod of pure iron, supplied by the Carlo Erba firm and having a diameter of 1 mm, was introduced into a tube of silica having an inside diameter of 2.7 mm and an outside diameter of 5.5 mm. One end of said tube 17 and one end of said rod 16 were respectively fixed to the clamps 11 and rollers 18, thereby allowing both the tube and the rod to be advanced inside the heating zone (at the temperature of 2,100°C) at different and independent speeds.

By keeping the drawing rate performed by the coil winder constant (100 m/min) and by varying the feeding speeds of the tube and of the rod inside the heating zone, covered metal wires (see Table 3) having different ratios of metal core diameter to coating thickness were obtained, although starting from the same metal rod and from the same silica tube.

The heating zone used in Examples 1–3 may be the crucible illustrated in FIGS. 6 and 7.

With reference to FIGS. 4 through 9, the heating crucible is shaped in the form of a truncated cone (FIGS. 6 and 7), so that the melting of the metal and the simultaneous softening of the glass or glass-ceramic material, shall occur in the lower part of the crucible itself. It is advisable to choose a type of glass or glass-ceramic that will show in the softened state, a viscosity of about $10^3 +10^4$ poises at a temperature greater than the melting point of the metal or of the alloy to be drawn.

When a tube is passed through the crucible without a metal bar, a drop is formed which, when drawn, will form hollow glass fibers.

When the metal is contained in the tube as a rod or when it completely fills up the tube, there will occur the formation of a drop expanded by the metal as its melting proceeds. The simultaneous drawing of the metal-tube combination forms a coated metal wire. Heat transfer to the material of the tube by the metal as it solidifies, tends to expand the stretching zone of the material and therefore may cause the rupture of the capillary in formation, or may cause a discontinuity in the metal part.

The cooling of the glass or glass-ceramic drawing zone, provided by the invention permits the solidification of the metal, once the drawing of the glass or glass-ceramic material has been accomplished, that is, once the capillary of said material has attained a constant diameter with the drawing of a continuous wire of uniform diameter.

TABLE 1

| Test No. | Drawing Rate m/min | Feeding Speed of Glass Tube cm/min | Feeding Speed of Copper Wire cm/min | Diameter of Copper Wire μm | Thickness of Glass Coating μm | Ratio Metal Core Diameter/Thickness Coating |
|---|---|---|---|---|---|---|
| 1 | 20 | 0.5 | 0.5 | 16 | 40 | 0.4 |
| 2 | 20 | 0.5 | 10 | 70 | 18 | 3.9 |
| 3 | 20 | 4.5 | 0.5 | 18 | 100 | 0.18 |
| 4 | 20 | 4.5 | 40 | 140 | 65 | 2.15 |
| 5 | 2000 | 0.5 | 0.5 | 2 | 5 | 0.4 |
| 6 | 2000 | 0.5 | 10 | 8 | 2 | 4.0 |
| 7 | 2000 | 4.5 | 0.5 | 2 | 9 | 0.22 |
| 8 | 2000 | 4.5 | 40 | 13 | 6 | 2.17 |

TABLE 2

| Test No. | Drawing Rate m/min | Feeding Speed of Tube cm/min | Feeding Rate of Rod cm/min | Diameter of Metal Wire μm | Thickness of Coating μm | Ratio Metal Core Diameter/Thickness Coating |
|---|---|---|---|---|---|---|
| 1 | 25 | 1 | 1 | 20 | 37 | 0.54 |
| 2 | 25 | 1 | 4 | 40 | 30 | 1.33 |

TABLE 3

| Test No. | Drawing Rate m/min | Feeding Speed of Tube cm/min | Feeding Speed of Rod cm/min | Diameter of Metal Wire μm | Thickness of Coating μm | Ratio Metal Core Diameter/Thickness Coating |
|---|---|---|---|---|---|---|
| 1 | 100 | 1 | 1 | 10 | 20 | 0.5 |
| 2 | 100 | 1 | 4 | 20 | 16 | 1.25 |

The cooling system (FIGS. 8 and 9) comprise a device placed underneath the crucible, in which device there flows a closed circuit lubricant liquid circulating at room temperature. This cooling system shortens the glass, or glass-ceramic material, stretching zone so that the solidification of the metal will occur once the drawing of said material has been accomplished. The liquids used for the purpose may be water, glycerine, a solution of glycerine and water, silicone oils, or the like.

The dispersion of the heat, generated by the solidification of the metal, occurs inside the cooling liquid which brings the wire down to room temperature. By causing drastic thermal shocks, it is possible to produce the rupture of the coating, thereby allowing to produce metal wires without a coating. The cooling device may be placed at various distances from the crucible thus varying the cooling rate of the metal and of the coating, and consequently, also the characteristics of the coated wire thus obtained.

The winding up and drawing system with reel may attain a speed of 15,000 r.p.m., with an automatic speed control and suitable equipment for properly arranging the wire on the surface of the reel drum, depending upon the treatments and on the subsequent applications.

An automatic system for measuring the continuity and uniformity of the wire is obtained through a condenser with dielectric constant varying according to the conditions of the fiber.

In FIGS. 4 and 5 there is illustrated the feeding device with driving motor 1A which acts on the tube 17 of glass or glass-ceramic material while motor 10A acts on the metal rod or bar 16. The tube 17 and metal rod 16, coaxial to the tube, advance vertically at constant and independent feed rates through crucible 22 made of an electrically conductive material, in general of Pt-Rh, and heated as a resistor. The feeding device may be the one illustrated in detail in FIGS. 1 through 3.

The transformer 25 supplies electrical current to the crucible 22 through two current carrying terminals 24 water cooled and supported by flexible cables so as to allow for thermal expansion of the crucible. The terminal clamps 24 grip wings 23 of crucible 22 which is completely insulated with refractory material except for the two openings.

The temperature of crucible 22 is controlled by a series of conventional thermocouples, (not shown in the drawings for the sake of similicity). The thermocouples are connected with an automatic temperature control device 26 (CAT) which is capable of monitoring the power supplied to the transformer 25. In this way, uniform heating of the crucible is insured.

The cooling device 27, arranged under the crucible, is supported by a mechanical device for its perfect positioning in the three directions. It is built in such a way that filaments being formed will pass through a cooling liquid, circulating in a closed circuit at room temperature, before proceeding towards the winding up reel 28. The wire is thus brought to the temperature of the liquid. The cooling oils or solutions also facilitate the winding of the wire on the reel 28 because a layer thereof less than 1 micron thick remains adherent to the surface of the coated wire.

Before reaching reel 28, the coated wire 29 passes through the armatures of a microcondenser 30 capable of evaluating the uniformity of diameter of the wire and the continuity of its metal core.

The winding reel 28 is arranged on a support whose displacement in three directions ensures its perfect centering. The winding reel 28 has a wire-crossing device 31 which guides coated wire 29 and arranges it on the take-up drum in a predetermined way.

FIGS. 6 and 7 show in detail the geometrical shape of crucible 22 of FIGS. 4 and 5. Wings 23 are inserted in the power carrying terminal clamps 24 connected with the transformer 25 which, depending upon the size of the crucible, may supply from 1 to 10 kVA.

The crucible 22 shaped like a truncated cone, has dimensions which may vary according to the type of metal, of the glass or glass-ceramic material and of the drawing conditions. The lower inside diameter of the truncated cone of the crucible may vary from 8 to 16 mm and, correspondingly, the upper inside diameter may vary from 15 to 30 mm, with heights of respectively from 20 to 30 mm. The melting of the metal and the shoftening of the tube take place in the lower zone of the crucible and allows the simultaneous hot drawing of the wire.

FIGS. 8 and 9 show in detail the cooling device 27 of FIGS. 4 and 5.

The coated wire 29 as it forms is passed through cavity 20 of the small tube 31. It is easily inserted through aperture 32. Cooling liquid, at room temperature, fed by inlet pipe 35, passes from trap 33 through holes 34 into cavity 20. The liquid is pumped by a metering pump under pressure through inlet 35. The cooling liquid wets the coated wire 29 as it is being formed for a certain stretch of space which starts in small tube 31. As illustrated in FIG. 9, the upper portion of tube 31 has the shape of an inverted cone with its apex joining the apex of a lower conical portion. Such structure avoids loss from sputtering and facilitates gathering it in containers 37 from which it is discharged through tube 36 for recycling.

In this way the cooling liquid is in direct contact with the drawing zone of the coated wire 29.

The wire reduced to the temperature of the liquid, carries along part of the cooling liquid itself and has a wet surface. This fact may be advantageous because the proper choice of cooling liquid may serve to cover the coated wire with a lubricant that will facilitate the subsequent processing of the wire itself. EXAMPLE 4

An electrolytically pure copper rod (titre 99.93 percent with impurities of P < 0.05 percent, Ca, Fe, Mg, Pb, Sn, Ag) of 2 mm of diameter, was introduced into SUPERMAX glass tube (a borosilicate glass by Schott & Genossen) with an inside diameter of 2.7 mm and an outside diameter of 5.3 mm. The tube 17 and the rod 16 were fed into crucible 22 by the feeding device described in FIGS. 1, 2, 3, 4 and 5 at the same rate of 10 mm/min.

The crucible 22 of Pt-Rh at 20 percent and with a height of 24 mm, heated by a power input of 1 kVA, melted the lower part of the metal 16 and softened the glass 17, so that both were drawn simultaneously by the winding up reel 28. With a drawing rate, performed by the winding-up reel, of 100 m/min, a copper wire having a diameter of 20 $\mu$m coated with a thickness of glass of 15 $\mu$m was obtained; the wire was continuous both in the metal and in the glass part and was of uniform diameter.

With a drawing rate of 500 m/min, a copper wire having a diameter of 9$\mu$m coated with a thickness of glass of 7 μm was obtained; the wire was continuous both in the metal and in the glass part and it was of uniform diameter.

The cooling device 27 was placed, in both tests, at a distance of about 3 mm between the bottom of the crucible 22 and the upper surface of the cooling liquid in the tube 31 of FIG. 9. The cooling liquid was a silicon oil of the 200/50 type sold by Dow Corning Corp.

The electrical characteristics of the metal wire, in spite of the cooling, are not appreciably different from those of the starting copper. The mechanical characteristics depend on the diameter of the wire.

In order to avoid oxidation of the copper during the drawing, an inert atmosphere is maintained inside the glass tube. The coated wire may be used as conductors in transformers and in miniature electronic circuits.

EXAMPLE 5

A silver rod (titre 99.97 percent) of 1 mm diameter was placed in a Pyrex glass tube (borosilicate glass by Corning Glass Corp.) having an inside diameter of 2 mm and an outside diameter of 4 mm. The combination of rod and tube was inserted in a feeding device that imparted to the glass tube a feeding rate of 10 mm/min and to the metal rod a rate of 6.5 mm/min.

With a power of 1 kVA, the crucible 22 of Pt, 18 mm high, was brought up to such a temperature as to soften the glass and to melt the silver so that they could be drawn simultaneously by the winding-up reel 28. With a drawing rate, performed by the winding-up reel 28, of 16 m/min, a silver wire having a diameter of 20 μm coated with a thickness of glass of 40 μm was obtained; the wire was continuous both in the metal and in the glass coating and it was of uniform diameter. With a drawing rate of 4 m/min a silver wire having a diameter of 40 μm coated with a thickness of glass of 80 μm was obtained; the wire was continuous both in the metal and in the glass coating and it was of uniform diameter.

The cooling device was placed while preparing both wires at a distance of about 3 mm, between the bottom of the crucible and the upper surface of the cooling liquid. Glycerine containing 10 percent by weight of water was used as the cooling liquid.

These wires may be conveniently used in physiology as micro-electrodes.

EXAMPLE 6

A pure iron rod, supplied by Carlo Erba firm, of 1 mm diameter was placed in a silica tube having an inside diameter of 2.7 mm and an outside diameter of 5.5 mm; the tube and the rod were fed into crucible 22 by the feeding device described in FIGS. 1, 2, 3, 4 and 5 at the same speed of 10 mm/min. The crucible, made of Ir with a height of 24 mm, heated with a power of about 2 kVA, melted the lower end of the metal rod and softened the silica tube so that they were both simultaneously drawn by the winding-up reel 28. With a drawing rate, performed by the winding-up reel 28, of 100 m/min, an iron wire having a diameter of 10 μm coated with a thickness of silica of 24 μm was obtained; the wire was continuous both in the metal and in the silica part and was of uniform diameter.

With a drawing rate of 1,000 m/min, an iron wire having a diameter of 3 μm coated with a thickness of silica of 8 μm was obtained; the wire was continuous both in the metal and in the silica part and it was of uniform diameter. In both tests, the cooling device 27 was placed at a distance of 5 mm between the bottom of the crucible 22 and the upper surface of the cooling liquid used which was a silicon oil of the 200/50 type sold by Dow Corning Corp.

These wires may be conveniently used in physiology as micro-electrodes, in composite materials as reinforcing fibers, or as thermocouples.

EXAMPLE 7

A pure aluminum rod, Rafinal type, produced by I.S.M.L. firm, of 1 mm diameter was placed into a glass-ceramic tube of the following molar composition: $SiO_2$ 60%; $Al_2O_3$ 10%; $Li_2O$ 30% and having an inside diameter of 3.0 mm and an outside diameter of 5.0 mm; the tube and the rod were fed into the crucible by the feeding device described in FIGS. 1, 2, 3, 4 and 5 at the same speed of 10 mm/min.

The crucible 22, made of Pt-Rh at 10 percent with a height of 24 mm, heated with a power of about 1 kVA, melted the lower end of the metal rod and softened the tube so that they could be drawn simultaneously by the winding-up reel 28. With a drawing rate, performed by the winding-up reel, of 100 m/min, an aluminum wire having a diameter of 10 μm coated with a thickness of glass-ceramic material of 16μm was obtained; the wire was continuous both in the metal and in the glass-ceramic part and it was of uniform diameter. With a drawing rate of 1,000 m/min an aluminum wire having a diameter of 3μm coated with a thickness of glass-ceramic material of 5μm was obtained; the wire was continuous both in the metal and in the glass-ceramic part and it was of uniform diameter.

In both runs, the cooling device was placed at a distance of 5 mm between the bottom of the crucible 22 and the upper surface of the cooling liquid used which was silicon oil of 200/50 type sold by Dow Corning Corp.

These wires were introduced in a continuous way into a tubular oven at 570° C to obtain complete devitrification of the glass-ceramic coating. These wires may be conveniently used in the electrical field as conductors.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. An apparatus for moving a rod and a tube thereabout vertically at rates of speeds which are independent of each other comprising a pair of rollers adapted to grip the rod therebetween and move it forwardly as the rollers are rotated, a drive means for rotating the rollers, means for varying the speed of rotation of the rollers, and means for moving said tube forwardly about the rod comprising a screw, means for gripping the tube threadably mounted on said screw and fixed against rotation therewith whereby it is adapted to move along the screw as the screw is rotated and carry said tube therewith, means for rotating the screw, and means for varying the speed of rotation of the screw.

2. The apparatus of claim 1 in combination with means for melting said rod and softening a glass or glass-ceramic tube thereabout, and means for drawing a coated wire from the heating means.

3. The apparatus of claim 2 wherein said screw is driven by a motor provided with a variable speed reducer.

4. An apparatus for forming a metal wire coated with glass or a glass-ceramic material comprising a truncated conically shaped crucible of an electrically resistant metal, means for supplying electricity to the crucible and thereby heating the crucible, means for supplying a metal rod and a glass or glass-ceramic tube thereabout to the crucible comprising a pair of rollers adapted to grip the rod therebetween and advance it into the crucible as the rollers are rotated, means for rotating the rollers, means for varying the speed of rotation of the rollers, means for moving the tube into the crucible comprising a worm screw, means threadably mounted on the screw fixed against rotation therewith and adapted to move along the screw as it is rotated, said fixed means carrying means for gripping said tube and moving the tube forward as it moves with rotation of the screw, means for rotating the screw independently of the means for rotation of the rollers, means for varying the speed of rotation of the screw, means containing a cooling liquid, and means for drawing a wire from molten metal and softened glass in said crucible and through said cooling means.

* * * * *